Figure 1:
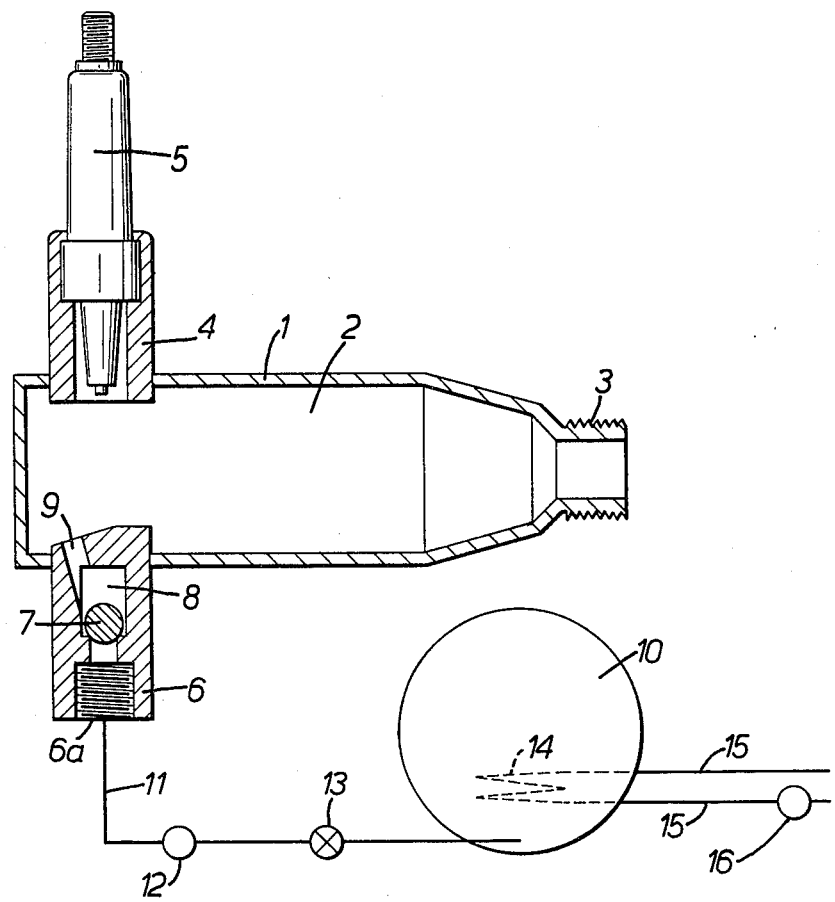

United States Patent [19]

Szloboda

[11] Patent Number: 4,476,819
[45] Date of Patent: Oct. 16, 1984

[54] FUEL ECONOMY DEVICE

[76] Inventor: David T. Szloboda, 10640 Skagit Dr., Richmond, British Columbia, Canada, V7E 2A2

[21] Appl. No.: 473,269

[22] Filed: Mar. 8, 1983

[30] Foreign Application Priority Data

Mar. 15, 1982 [CA] Canada .................................. 398383

[51] Int. Cl.³ ............................................. F02D 19/00
[52] U.S. Cl. ............................... 123/25 C; 123/25 A; 123/585
[58] Field of Search .................. 123/25 P, 25 J, 25 A, 123/25 B, 25 D, 25 C, 25 K, 25 L, 585, 586, 588

[56] References Cited

U.S. PATENT DOCUMENTS

| | | | |
|---|---|---|---|
| 343,745 | 6/1886 | Wilcox | 123/25 C |
| 713,366 | 11/1906 | Wallman | 125/25 D |
| 1,008,871 | 11/1911 | Sodeau | 123/25 C |
| 1,094,993 | 4/1914 | Hopkinson | 123/25 L |
| 1,496,711 | 6/1924 | Kierland | 123/25 K |
| 1,598,243 | 8/1926 | Chapin | 123/586 |
| 1,782,642 | 11/1930 | Wiley | 123/25 D |
| 2,153,350 | 4/1939 | Stimac | 123/586 |
| 4,018,192 | 4/1977 | Est | 123/25 C |

*Primary Examiner*—Ronald H. Lazarus
*Attorney, Agent, or Firm*—Fleit, Jacobson, Cohn & Price

[57] ABSTRACT

A fuel economy device comprising a body formed to define a chamber having an externally screw threaded neck portion and communicating with the chamber an internally screw threaded aperture for receiving a spark plug and an inlet pipe including a non-return valve provided to facilitate the injection of water into the chamber and to resist the flow of gas from the chamber.

10 Claims, 2 Drawing Figures

U.S. Patent  Oct. 16, 1984  4,476,819

FUEL ECONOMY DEVICE

This invention relates to a fuel economy device for spark ignition internal combustion engines.

With the increasing cost of fuels, it is becoming increasing important to maximise the efficiency of internal combustion engines.

Since the second world war, the automobile industry has developed more powerful engines having higher compression ratios and shorter working strokes which run at higher revolutions per minute. Because of the comparatively short duration of the ignition stroke in these modern engines, high octane slow burning fuels are required to prevent 'pinking' with the result that combustion tends to be inefficient and unburnt fuel is exhausted to atmosphere. This obviously gives rise to pollution of the atmosphere and thus some engines are now being fitted with after-burners, so-called catalytic convertors, which serve as a somewhat inefficient method of reducing pollution due inter alia to unburnt fuel in exhaust gases.

The present invention has for an object to improve combustion efficiency whereby the presence of unburnt fuel in engine exhaust gases is obviated or at least minimised.

According to one aspect of the present invention a fuel economy device comprises a body formed to define a chamber having an externally screw threaded neck portion and communicating with the chamber an internally screw threaded aperture for receiving a spark plug and an inlet pipe including a non-return valve provided to facilitate the injection of water into the chamber and to resist the flow of gas from the chamber.

In use, the neck portion of the body is screwed into the cylinder head of an engine in place of a spark plug, the spark plug being fitted in the aperture of the body. Water is introduced in a controlled manner into the chamber via the non-return valve so as to produce ionised dry steam which serves to improve the efficiency of combustion.

The economy device may form a part of an engine system and according to another aspect of the invention, the engine system comprises a water tank coupled to the inlet pipe which includes the non-return valve, a flow control valve adjustable for providing a predetermined flow of water from the water tank to the chamber, an ON/OFF valve operative to control the flow of water to the chamber, and a thermostat responsive to engine operating temperature for opening the ON/OFF valve when a predetermined engine operating temperature is reached.

The system may include also air valve means via which atmospheric air is admitted to an inlet manifold of the engine with which the engine system is operatively associated.

The air valve means may be responsive to an engine speed sensor so as to admit air to the manifold only when a predetermined engine speed is exceeded.

The air valve means may be responsive to the thermostat so as to operate only when the ON/OFF valve is opened.

The air valve means may comprise two serially connected valves one of which is responsive to the thermostat and the other of which is responsive to the engine speed sensor.

The water tank may include an immersion heater for heating water contained therein.

The immersion heater may include a heat exchanger which derives heat from the engine with which the system is associated.

The heat exchanger may include a water pipe adapted to be connected to the engine cooling system so as to receive heat from the engine.

The chamber may be generally cylindrical, the neck portion being positioned at one end of the body and the said aperture and inlet pipe being positioned at the other end of the body.

The non-return valve may be a ball valve arranged to work under gravity.

Figure 2:
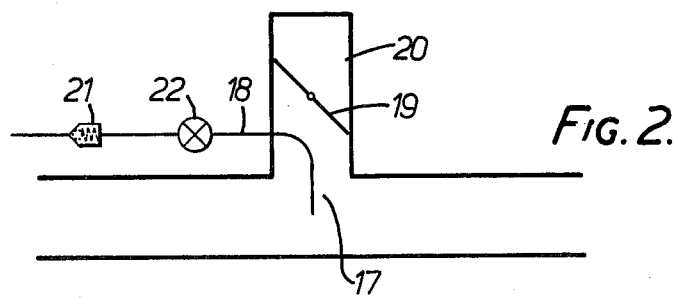

One embodiment of the invention will now be described solely by way of example with reference to the accompanying drawings in which:

FIG. 1 is a somewhat schematic front view partly in section of a fuel economy device; and FIG. 2 is a generally schematic front view of an inlet manifold of an engine with which the fuel economy device shown in FIG. 1 is associated.

Referring now to FIG. 1, an economy device comprises a body 1 fabricated from corrosion resistant metal such as stainless steel which is formed to define a chamber 2 having an externally threaded neck portion 3. The body 1 is generally cylindrical and it is provided at its end thereof remote from the threaded neck portion 3 with an aperture defined by an internally threaded spark plug collar 4. A spark plug 5 is fitted in the collar 4. The body 1 is also provided with an inlet pipe 6 which is positioned opposite the collar 4 and which includes a non-return valve comprising a steel ball 7 which is fitted in a valve chamber 8. An inlet passage 9 is provided which links the valve chamber 8 directly with the chamber 2. In use of the economy device, the externally threaded neck portion 3 is screwed into the cylinder head of an internal combustion engine in place of a spark plug. Water is introduced into the chamber 2 via the valve 6 in a controlled manner and instantly vapourises to produced ionised dry steam which serves to improve the efficiency of combustion.

The device forms part of a system including a water storage tank 10 which is coupled to the non-return valve 6 via an inlet pipe 11. The inlet pipe 11 is fitted at one end with a hydraulic adapter which screws to internal screw threads 6a of the non-return valve 6. Connected in series with the water supply pipe 11, there is provided a flow control valve 12 and a water ON/OFF valve 13. Water in the water tank 10 is heated by means of a heat exchanger 14 which is coupled via pipes 15 to the cooling system of an engine with which the system is associated. The engine operating temperature is sensed by means of a thermostat 16 which is responsive to the temperature of the engine cooling water, to open the valve 13 when a predetermined engine operating temperture is exceeded. Thus it will be appreciated that due to operation of the heat exchanger 14 heated water is fed via the valve 13 at a flow rate determined by the setting of the flow control valve 12.

In order to further improve fuel economy and optimise engine operating characteristics during tick over, it is desirable to introduce under controlled conditions a predetermined quantity of additional atmospheric air into the inlet manifold 17 shown in FIG. 2. For this purpose a bleed air inlet pipe 18 is provided which feeds the inlet manifold 17 below a butterfly valve 19 and a carburetter 20. Air is fed to the pipe 18 via serially connected inlet valves 21 and 22. The valve 21 is a spring loaded check valve and the valve 22 is a normally closed solenoid activated poppet valve 16 which opens when the thermostat 16 senses a predetermined engine operating temperature. The spring loaded check valve 21 is arranged to be responsive to a tachometer whereby the valve opens only at engine speeds between 1000 and 1200 rpm whereby engine idling speed is maintained. If this valve 21 is not provided, then the engine may stall at low revolutions per minute. Conveniently it may be arranged that the solenoid valve 22 and the valve 13 which may also be a solenoid valve, are operated synchronously by the thermostat 16.

The whole system is automatic and self-regulating and operates when properly installed in a trouble free manner. The water tank 10 is preferably fabricated of flexible material such as rubber so as to compensate for expansion due to winter freezing conditions. In order to allow the whole system to be switched off, an on/off toggle switch may be provided on the dash board via which power to the thermostat is provided. Thus by operation of the toggle switch the valve 22 and the valve 13 may be closed so that the system is inoperative.

In operation of the system, the valves 22 and 13 will be opened when the engine operating temperature is reached. Water will be passed via the valve 13, the flow control valve 12 and the inlet pipe 11 to the non-return valve 6 and thus to the chamber 2. The body 1 defining the chamber 2 will be hot and serves instantly to vapourise the small quantity of water which is injected. The non-return valve 6 is made of cemented high temperature alloy to resist annealing, and the ball valve 7 relies on gravity to eliminate hammering of the valve seat.

Experiments have shown that the spark has to be advanced slightly to compensate for a slight delay due to the operation of the ioniser chamber 2. The ignition occurs in the ioniser chamber 2 first and then in the cylinder. Special care should be taken when installing the system not to over-advance the ignition, since dieselling of the engine may occur and the engine may continue to run even when the ignition is turned off. Experiments have shown that the water entering the ioniser chamber 2 has a temperature equalising effect which keeps it at a constant temperature. It will be appreciated that the system as just before described will find application in stationery engines as well as in mobile engines for vehicles.

It has been found that by utilizing a system as just before described great savings may be effected whether using propane or petrol for fuel. The reason for the fuel economy improvement is related to a cracking process which takes place in the chamber 2 when ionising occurs which serves to convert substantially all hydrocarbon fuel into hydrogen and carbon in the cylinder and clean the engine of carbon particles.

It is to be appreciated that the embodiment of the invention described above has been given by way of example only and that modifications may be effected.

I claim:

1. An engine system comprising a fuel economy device, the fuel economy device comprising a body formed to define an elongate chamber, the body having at one end an externally screw threaded neck portion for screwing into a spark plug aperture of an engine, and the body having at its other end an internally screw threaded aperture which communicates with the chamber and which is for receiving a conventional spark plug and an inlet pipe which communicates with the chamber and which includes a non-return valve provided to facilitate the introduction of water into the chamber and to resist the flow of gas from the chamber, the non-return valve having a floating ball obturator, and the engine system further comprising a water tank coupled to the inlet pipe which includes the non-return valve, a flow control valve adjustable for providing a predetermined flow of water from the water tank to the chamber, an ON/OFF valve operative to control the flow of water to the chamber, and a thermostat responsive to engine operating temperature for opening the ON/OFF valve when a predetermined engine operating temperature is reached, the fuel economy device being such that it is screwable into the spark plug aperture of the engine in place of the conventional spark plug with the conventional spark plug then being screwed into the internally screw threaded aperture in the body of the fuel economy device.

2. An engine system according to claim 1 and including air valve means via which atmospheric air is admitted to an inlet manifold of the engine with which the engine system is operatively associated.

3. An engine system according to claim 2 in which the air valve means is responsive to an engine speed sensor so as to admit air to the manifold only when a predetermined engine speed is exceeded.

4. An engine system according to claim 2 in which the air valve means is responsive to the thermostat so as to operate only when the ON/OFF valve is opened.

5. An engine system according to claim 2 in which the air valve means comprises two serially connected valves one of which is responsive to the thermostat and the other of which is responsive to the engine speed sensor.

6. An engine system according to claim 1 in which the water tank includes an immersion heater for heating water contained therein.

7. An engine system according to claim 6 in which the immersion heater includes a heat exchanger which derives heat from the engine with which the system is associated.

8. An engine system according to claim 7 in which the heat exchanger includes a water pipe adapted to be connected to the engine cooling system so as to receive heat from the engine.

9. An engine system according to claim 1 in which the chamber is generally cylindrical, the neck portion being positioned at one end of the body and the said aperture and inlet pipe being positioned at the other end of the body.

10. An engine system according to claim 1 in which the non-return valve is a ball valve arranged to work under gravity.

* * * * *